(12) United States Patent
Saba et al.

(10) Patent No.: US 10,922,624 B2
(45) Date of Patent: Feb. 16, 2021

(54) IDENTIFYING USERS OF SHARED DEVICES BASED ON USER INTERACTIONS AND IDENTITY GRAPH

(71) Applicant: Facebook, Inc., Menlo Park, CA (US)

(72) Inventors: Marc Christian Saba, Palo Alto, CA (US); Mohammad Shahroze Khan, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 901 days.

(21) Appl. No.: 15/622,943

(22) Filed: Jun. 14, 2017

(65) Prior Publication Data

US 2018/0349800 A1    Dec. 6, 2018

Related U.S. Application Data

(60) Provisional application No. 62/513,696, filed on Jun. 1, 2017.

(51) Int. Cl.
*G06N 20/00* (2019.01)
*H04L 29/08* (2006.01)
*G06N 5/02* (2006.01)
*G06N 5/04* (2006.01)

(52) U.S. Cl.
CPC ............ *G06N 20/00* (2019.01); *H04L 67/22* (2013.01); *H04L 67/306* (2013.01); *G06N 5/02* (2013.01); *G06N 5/04* (2013.01)

(58) Field of Classification Search
None
See application file for complete search history.

(56) References Cited

U.S. PATENT DOCUMENTS

2016/0148255 A1* 5/2016 Shariat ............... G06Q 30/0255
                                                        705/14.53

\* cited by examiner

*Primary Examiner* — Daniel C Puentes
(74) *Attorney, Agent, or Firm* — Fenwick & West LLP

(57) ABSTRACT

An online system receives a request from a third-party application for a content item to be delivered to a user of a user device, the request including a device identifier corresponding to the user device used to access the third-party application. In order to deliver a targeted content item, the online system accesses inference model to infer an identity of the user, based upon device usage parameters based upon the received request, historical data associated with the device identifier, or an indication of activity associated with the device identifier on the online system or one or more first-party applications.

20 Claims, 5 Drawing Sheets

IDENTIFYING USERS OF SHARED DEVICES BASED ON USER INTERACTIONS AND IDENTITY GRAPH

CROSS-REFERENCE TO RELATED APPLICATIONS

The present disclosure claims priority to U.S. Provisional Patent Application No. 62/513,696, titled "Identifying Users of Shared Devices Based on User Interactions and Identity Graph," filed on Jun. 1, 2017, which is hereby incorporated by reference in its entirety.

BACKGROUND

This disclosure relates in general to tracking user interactions with various applications through shared user devices, and in particular, to determining identity of a user interacting with applications through a shared user device, for the purpose of providing customized content to the user and improving user experience.

Systems and applications that provide content to users provide content based on the identity of the user and known information concerning the user. This may allow for content items to be provided that align with the preferences or interests of the user, potentially improving user interaction and user experience. In some cases, the identity of a user may be determined based on an identifier of the user device used to access the application. However, in cases where a user device may be shared and used by multiple users, it can be difficult to determine which user is currently using the application. As a result, content may be sent to users that are not interested in the content. Providing content to users that are not interested in it provides poor user experience. Furthermore, various resources of the system are inefficiently utilized in transmitting content to devices of users that not likely to interact with it. For example, the system wastes network resources, storage, and processor resources in sending and processing these content items. This can also be an issue for third party applications on mobile devices that receive and publish content from other systems, since it is difficult determine which user is currently using the device so that the third party application can provide content relevant to that user.

SUMMARY

An online system provides a way to infer which user is currently using a shared device for providing to the user content on a third party application or site separate from the online system. The online system receives a request from a third-party application to deliver a content item to a user of a user device, the request including a device identifier corresponding to the user device used to access the third-party application. However, because a single user device may be shared by a plurality of different users, the identity of the specific user associated with the request may not be known even if the device identifier is known. In order to deliver a content item targeted towards users having a specific user profile, the online system accesses an inference model to infer which of the plurality of users of the user device is using the user device. The inference model determines the user based upon device usage parameters associated with the received request, historical data associated with the device identifier, or an indication of activity associated with the device identifier on the online system or one or more first-party applications.

In some embodiments, the inference model is trained, using machine learning, against training data comprising historical usage data of a plurality of users associated with the user device, the historical usage data describing user interactions of each of the users with one or more applications, such as the online system, first-party applications, and/or third-party applications.

The inference model may be configured to determine one or more candidate users associated with the user device, the one or more candidate users corresponding to at least a portion of the plurality of users. In some embodiments, the inference model determines the candidate users based upon a stored graph or data structure indicating which users have used the user device in the past to access the online system, first-party applications, or third-party applications.

The inference model infers a user identifier from the set of candidate users based upon one or more device usage parameters. The one or more device usage parameters may be based upon the received request, historical data associated with the device identifier, or an indication of activity associated with the device identifier on the online system or one or more first-party applications. For example, the inference model may infer the user identifier based upon activities associated with known users within a threshold time of the request, or historical usage data indicating that certain users are more likely the use the user device during certain times, from certain locations, and/or to access certain applications. The online system may use the inferred user identifier to select and transmit to the third-party application a content item to be provided to the user in response to the received request.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
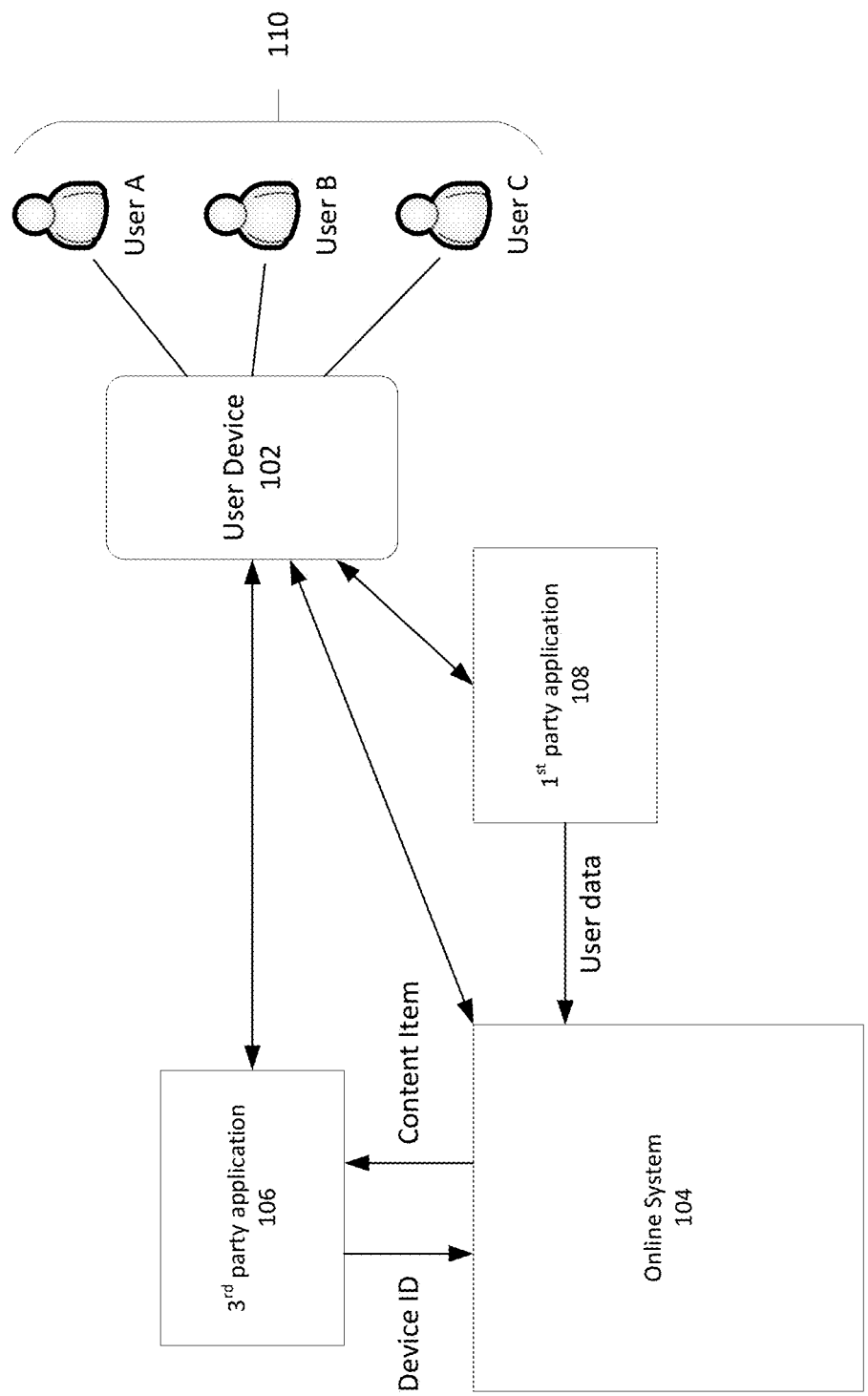
FIG. 1 is a block diagram of a system environment in which an online system operates, in accordance with an embodiment.

FIG. 1 shows a system environment illustrating the interactions between a user device 102, an online system 104, a third party application 106, and one or more first party applications 108, which may interact with each other via a network (not shown), according to an embodiment. In various embodiments, each of the online system 104, third party application 104, and first party application 108 may include additional, fewer, or different components for various applications. Conventional components such as network interfaces, security functions, load balancers, failover servers, management and network operations consoles, and the like are not shown so as to not obscure the details of the system architecture.

A user device 102 may a computing device configured to receive user input as well as transmitting and/or receiving data via a network. In one embodiment, the user device 102 is a conventional computer system, such as a desktop or laptop computer. Alternatively, the user device 102 may be a device having computer functionality, such as a personal digital assistant (PDA), a mobile telephone, a smartphone or another suitable device. In one embodiment, the user device 102 executes an application allowing a user of the user device 102 to interact with the online system 104, third party application 106, and/or first party application 108. For example, the user device 102 may execute a browser application (also referred to as a browser) to enable interaction between the user device 102 and the online system 104, third party application 106, and/or first party application 108 via a network. In another embodiment, the user device 102 interacts with the online system 104, third party application 106, and/or first party application 108 through an application programming interface (API) running on a native operating system of the user device 102, such as IOS® or ANDROID™. The user device 102 may be used by a plurality of different users 110 (e.g., user A, user B, user C, etc.). The user device 102 may be associated with a device ID. Each user of the users 110 may be associated with a user ID. In some embodiments, the user ID of a user 110 may correspond to an account associated with the user 110 on the online system 104.

As discussed above, the user device 102 may be configured to communicate via a network (not shown), which may comprise any combination of local area and/or wide area networks, using both wired and/or wireless communication systems. In one embodiment, the network uses standard communications technologies and/or protocols. For example, the network may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any suitable format, such as hypertext markup language (HTML) or extensible markup language (XML). In some embodiments, all or some of the communication links of the network may be encrypted using any suitable technique or techniques.

The online system 104, the third party application 106, and the first party application 108 may be configured to provide content items to user devices 102. Content items may correspond to any type of electronic media content item, and may include text, images, videos, audio, or combination of various media types. In an embodiment, the online system 104, the third party application 106, or the first party application 108 may receive requests for content items from the user device 102. In some embodiments, the online system 104, third party application 106, or first party application 108 may receive requests for content items from other applications. For example, in an embodiment, the third party application 106 may send a request to the online system 104 for one or more content items to be displayed to a user 110 at the user device 102.

The online system 104, third party application 106, or first party application 108 may process the received requests by accessing a content store (not shown) or other storage location. In some embodiments, the content store may be local to the online system 104, third party application 106, or first party application 108. In other embodiments, the content store may be remote from the online system 104, third party application 106, or first party application 108. For example, the content store may be managed by an application separate from the online system 104, third party application 106, first party application 108, wherein the online system 104, third party application 106, first party application 108 are able to receive content items from the content store through the separate application. The online system 104, third party application 106, or first party application 108 may format the content items received from the content store to be displayed to a user 110 at the user device 102 (e.g., via a browser).

In some embodiments, the users 110 at the user device 102 may access the online system 104 via one or more user accounts. Each user account may associated with one or more items of information relating to the user, which may include account information (e.g., account username, password, email, and/or the like), user provided information (e.g., demographic information of the user, content items provided by the user, and/or the like), user activity information (e.g., a record of interactions between the user 110 and the online system 104, such as logging in/out of the online system 104, requests for content items, and/or the like), etc. In some embodiments, the online system 104 shown in FIG. 1 may be a social networking system.

In one embodiment, a user 110 logs into an account on the online system 104 to access a personalized set of web pages, such as a user profile page and a newsfeed page, using the user device 102. Examples of interactions with between the user 110 and the online system 104 may include: commenting on posts, sharing links, and checking-in to physical locations via a mobile device, accessing content items, and any other interactions. Additional examples of interactions may include: commenting on a photo album, communicating with a user, establishing a connection with an object, joining an event to a calendar, joining a group, creating an event, authorizing an application, using an application, expressing a preference for an object ("liking" the object) and engaging in a transaction. In some embodiments, the online system 104 may store a history of interactions with the users 110, which may include a type of interaction, a time of interaction, content items associated with the interaction, and/or the like.

The first party application 108 may refer to an application that is managed by a common entity as the online system 104. As such, information received by the first party application 108 (e.g., user accounts, user information, user activity logs, and/or the like) may be accessible to the online system 104. For example, users 110 may access the first party application 108 through accounts different from the accounts used to access the online system 104. However, the online system 104 may have access to account information associated with the first party application accounts (e.g., usernames, personally identifiable information (PII) such as email addresses, user preferences or interests, user interaction histories, and/or the like). The online system 104 may make use of the information received by the first party application 108 to perform a variety of different functions, such as collect and aggregate information associated with different users 110 of the user device 102, track activities of different users 110 of the user device, and/or the like. In some embodiments, the first party application 108 may be managed by a subsidiary entity of the online system 104.

In contrast, the online system 104 may not have access to information received by the third party application 106. However, the third party application 106 may be able to transmit requests (e.g., requests for content items) to the online system 104. In some embodiments, the requests may include information that may be used by the online system 104 in fulfilling the request, such as type of request, device ID of the user device 102 associated with the request, time of request, and/or the like. In some embodiments, the request may contain additional information. For example, the user 110 may access the third party application 106 through a third party application account. As such, the request may contain information associated with the third party application account associated with the user 110 (e.g., account name, user information associated with the account such as email, and/or the like). In some embodiments, the online system 104, in response to receiving the request from the third party application 106, may transmit one or more content items to the third party application 106 to be displayed to the user 110 at the user device 102.

In some embodiments, the content item request from the third party application 106 to the online system 104 may be for a specific content item. In other cases the third party application 106 may request the online system 104 to select a content item, based upon one or more attributes associated with the user 110 who is accessing the third party application 106. For example, the online system 104 may select a content item to be displayed to the user 110 that is determined to be relevant to the user 110, based upon known information concerning the user 110 (e.g., based upon the user's 110 known demographics, expressed interests, past activities, and/or the like). For example, the content item may comprise an advertisement targeted to the user 110, a content item determined by the online system to be of interest to the user 110 (e.g., a newsfeed item, a recommendation), and/or the like.

However, as discussed above, a single user device 102 may be used by multiple users 110. In some embodiments, while the third party application 106 may receive the device ID of the user device 102, the third party application 106 may not know which of the users 110 is actually using the user device 102 when a request for content items is made. In some embodiments, the request from the third party application 106 to the online system 104 may include the device ID of the user device 102. The online system 104 may, based upon the received device ID, determine a user ID of a user 110 most likely to be associated with the request, and return a content item to the third party application 106 based upon the determined user. Systems and methods for determining a user most likely associated with the request are described in greater detail below.

System Architecture

Figure 2:
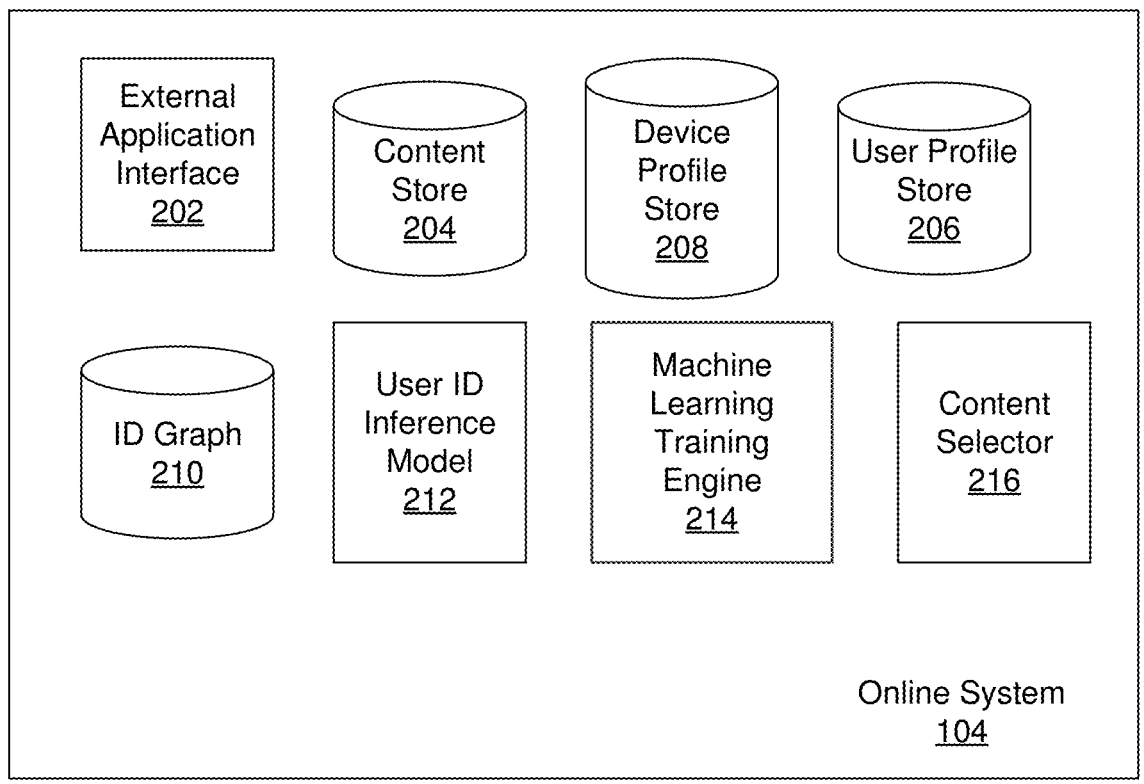
FIG. 2 is a block diagram of a system architecture of the online system, in accordance with an embodiment.

FIG. 2 is a block diagram of a system architecture of an online system 104, in accordance with an embodiment. The architecture of the online system 104 includes an external system interface 202, a content store 204, a user profiles store 206, a device profile store 208, an ID graph 210, user ID inference model 212, a machine learning training engine 214, and a content selector 216. In some embodiments, the online system 104 may omit one or more of the components or modules described above, or may further comprise additional components or modules not shown in FIG. 2.

The external system interface 202 shown in FIG. 2 may comprise a dedicated hardware networking device or software module that transmits and receives data packets associated with interactions between the online system 104 and one or more user devices (e.g., user device 102) and other applications (e.g., third party application 106 or first party application 108). For example, the data packets may represent requests from the third party application 106 for content items, activity by a user 110 of the user device 102, content items to be transmitted to the third party application 106 or the user device 102, and/or the like. In one example, the external system interface 202 forwards data packets at high speed along the optical fiber lines of the Internet backbone. In another example, the external system interface 202 exchanges routing information using the Border Gateway Protocol (BGP) and may be an edge router, a border router, or a core router.

The content store 204 shown in FIG. 2 is used to store content items, which may be provided to the user device 102 or third party application 106 (e.g., in response to a request from the third party application 106). In addition, in some embodiments, the online system 104 may access content items from an external application or data store (e.g., through the external application interface 202). In some embodiments, different types of content items may be targeted to different types of users. For example, a content item may be targeted to a particular user based upon demographic information of the user, user-provided preference information, past user activity, or any other type of information associated with the user. The content items stored by the content store 204 may include text, images, videos, audio, files, or any combination thereof.

The user profiles store 206 shown in FIG. 2 stores user profiles or accounts of users of the online system 104. The user profiles store 206 may be organized as a database, table, file, etc., stored on one or more of removable or non-removable memory cards, tape cassettes, zip cassettes, and computer hard drives. In one embodiment, the user profiles store 206 includes multiple data fields, each describing one or more attributes of the users. In one example, the user profiles store 206 contains, for a single user, a username of the user, an email of the user, attribute information of the user such as birthdate, physical location, race, gender, education level, schools attended, place of work, occupation, an activity history of the user such as information about recent online purchases, whether the user regularly clicks on online articles from a certain online publisher, whether the user regularly shares content items with his or her social networking connections, information about the user's connections, from which user devices the user has used to access the online system 104 or other applications, etc. The profiles of users stored by the user profiles store 206 include information entered by a user, such as birthdate, gender, etc., as well as information inferred by the online system 104, such as whether the user regularly clicks on online articles from a certain online publisher, whether the user regularly shares content items with his or her social networking connections, information about recent online purchases, etc. In some embodiments, the user profiles store 206 may also store an activity history of the user associated with other applications. For example, as discussed above, the online platform 104 may receive information from the first party application 108. In some embodiments, interaction histories of users on the first party application 108 may be recorded in the user profiles store 206.

In one embodiment, data from the user profiles store 206 is used to infer interests or preferences of a user, which may augment any user-provided interests included in the user profile of the user on the online system 104, thus allowing a more complete understanding of user preferences for content items. For example, in some embodiments, the user profiles store 206 may track interactions of the users with content items, which may be analyzed to predict what types of content items the user may be most interested in.

In one embodiment, the user profiles store 206 may store user information associated with other applications, such as the first party application 108. As discussed above, the online system 104 may have access to user account information on the first party application 108. In some embodiments, the online system 104 may also receive user information from the third party application 106. In some embodiments, user information from other applications may be stored separately from the user information obtained through the user accounts on the online system 104. In other embodiments, user information from other applications may be combined with the online system user account information, if it can be determined which user account the user information from other applications is associated with. In some embodiments, the user information obtained from other applications may be associated with user accounts of the online system 104 using the ID graph 210, which is described in greater detail below.

The device profile store 208 illustrated in FIG. 2 stores information pertaining to user devices 102 that may be used by different users 110 to access the online system 104 or other applications. The device profile store 208 may be organized as a database, table, file, etc., stored on one or more of removable or non-removable memory cards, tape cassettes, zip cassettes, and computer hard drives. In one embodiment, the device profiles store 208 includes multiple data fields, each describing one or more attributes of the device. In one example, the device profile store 208 contains, for a single device, a device identifier (device ID), device IP address, activity history associated with the device, users associated with the device, and/or the like. For example, a plurality of different users may use the same user device to access the online system 104 or other applications. The device profile store 208 may store and maintain a record of activities from different users of each device. As such, data from the device profile store 208 may be used to determine which users of a particular user device are most likely to be using the user device during different time periods, which types of activities each user most commonly performs using the user device, and/or the like.

In some embodiments, the device profile store 208 may store data pertaining to the user device 102 obtained from other applications, such as the first party application 108. For example, the online system 104 may obtain from the first party application 108 information indicating activity of the user device 102 associated with the first party application 108. In some embodiments, the online system 104 may also obtain information associated with usage of the user device 102 from the third party application 106 (e.g., through one or more requests from the third party application 106).

The ID graph 210 illustrated in FIG. 2 may comprise a data structure used to track connections between different accounts associated with the same user, and/or different account associated with the same user device. A particular user may have multiple user accounts associated with different applications. For example, the user may have a first account on the online system 104, and a second account on the first party application 108. The online system 104 may receive information pertaining to different user accounts on other applications (e.g., through the external application interface 202) and associate user accounts of the other applications to user accounts of the online system 104, wherein the associated user accounts share a common user.

In addition, the ID graph 210 may associate user accounts with user devices. For example, a particular user may generally access their user accounts through one or more user devices. By tracking which user accounts are accessed on which user devices, the ID graph may be used to determine a set of possible users that may be associated with a request from a particular user device. In some embodiments, each user account or user device may be represented by a node in the ID graph 210, and connections between accounts or between accounts and devices may be represented by edges between the nodes. An example of the ID graph 210 is described in greater detail below with relation to FIG. 3.

The user ID inference model 212 (hereinafter also referred to as the "inference model") illustrated in FIG. 2 comprises a model that may be used to infer a user ID of a user most likely to be associated with a received request. For example, in some embodiments, the user ID inference model 212 may receive as input a request comprising at least a device ID and a timestamp, and return the user ID of a user most likely associated with the request. In some embodiments, the inference model 212 may determine the user ID based upon activity associated with the user device corresponding to the received device ID at or near the time indicated by the timestamp. The inference model 212 may also determine the user ID based upon historical usage data associated with the user device (e.g., time periods when the user device is most likely to be used by particular users, usage habits of different users of the user device, and/or the like). In some embodiments, the inference model 212 may calculate a score for each of a plurality of users, the score for a user indicating a likelihood that the user was associated with the received request. The inference model 212 may then output the user ID of the user having the highest score. An example of the inference model 212 is described in greater detail below with relation to FIG. 4.

The machine learning training engine 214 shown in FIG. 2 trains the inference model 212 using one or more training sets. Each training set includes a set of requests, as well as current device usage data and historical device usage data associated with the requests. The training set includes positive and negative examples, such that a positive example identifies a user that made a particular request and a negative example identifies a user that did not make the request. In some embodiments, the inference model 212 receives information describing requests received from a user device and a user ID of a particular user of the device and generates a score indicating a likelihood that the user with the user ID made the request. In some embodiments, the inference model 212 is configured to receive a request and generate a user ID of a user of the user device that is most likely to have made the request.

In some embodiments, the inference model 212 is trained using the machine learning training engine 214 on a periodic basis (e.g., every 3 days, every week, etc.). In some embodiments, the inference model 212 is trained based on requests from third-party applications received during a designated training period, when a user of the device is also logged into an account associated with the online system 102 (or the first party application 108), thus enabling the machine learning training engine 214 to confirm an accuracy of the inference model 212. For example, the user account associated with the online system 102 may be used to determine a user email or other parameters that may be used to identify the user.

In some embodiments, information that the user of the device is logged into the account associated with the online system 102 may be withheld from the inference model 212 during training, such that the inference model 212 attempts to infer a user ID of the user based upon other parameters (e.g., parameters based upon historical device usage). The user's account logged into the online system 102 may then be checked against the user ID inferred by the inference model 212. In some embodiments, training of the interface model 212 for different user devices 102 may take place over different time periods.

In embodiments, the inference model 212 may extract one or more parameters from the current and historical device usage data, and determine the user ID of a user most likely associated with the request by aggregating the extracted parameters using one or more parameter weights. For example, the inference model 212 may determine a score associated with each user of a plurality of users based upon the extracted parameters and parameter weights, and select a user ID of the user having the highest score. The machine learning training engine 214 adjusts the weights of the parameters based upon the results of the inference model 212 processing the training sets.

In some embodiments, the inference model 212 may be trained on a "per device" basis. For example, different user devices 102 may be associated with different types of users and usage habits, and as such the inference model 212 may be configured to use different parameter weights for extracted parameters associated with the different user devices 102. In some embodiments, the inference model 212 may access a set of parameter weights corresponding to a particular device, based upon a device ID associated with a received request. In some embodiments, the inference model 212 trains and maintains a set of parameter weights used for a plurality of different user devices 102.

The content selector 216 illustrated in FIG. 2 may comprise a software module configured to receive a user ID (e.g., from the inference model 212) and select a content item from the content store 204. The content selector 216 may access the user profile store 206 to retrieve information associated with the user corresponding to the received user ID. The retrieved information may comprise user demographic information, user preference information, user activity history, and/or any other type of information which can be used to select a content item to be presented to the user. For example, the content selector 216 may analyze the user's preference information recorded in the user profile store 206 to identify a content item from the content store 204 that may be of interest to the user. The online system 104 transmits the selected content item to the third party application 106 in response to a received request using the external application interface 202.

ID Graph

As discussed above, in some embodiments, a user may access a third party application 106 using the user device 102. The third party application 106 may transmit a request to the online system 104 for a content item to be presented to the user. For example, the online system 104, using the content selector 216, may be able to select a content item that is targeted to the particular user, based upon known information associated with the user (e.g., demographic information, past activity history of the user, and/or the like). However, the third party application may have access to the device ID of the user device 102 used by the user to access the third party application, but may not be aware of the identity of the specific user of the user device 102. As such, in order to be able to select and transmit a targeted content item to the third party application 106 in response to the received request, the online system 104 may need to determine a user identity of a user most likely associated with the request.

In some embodiments, the ID graph 210 maintained by the online system 104 links one or more user accounts with one or more devices. Each individual user may be associated with one or more accounts corresponding to one or more different applications. For example, a particular user (e.g., user A) may be associated with an account on the online system 104, an account on the first party application 108, and an account on the third party application 106. The user may be associated with one or more devices, corresponding to user devices from which the user accesses the online system 104, first party application 108, and/or the third party application 106.

Figure 3:
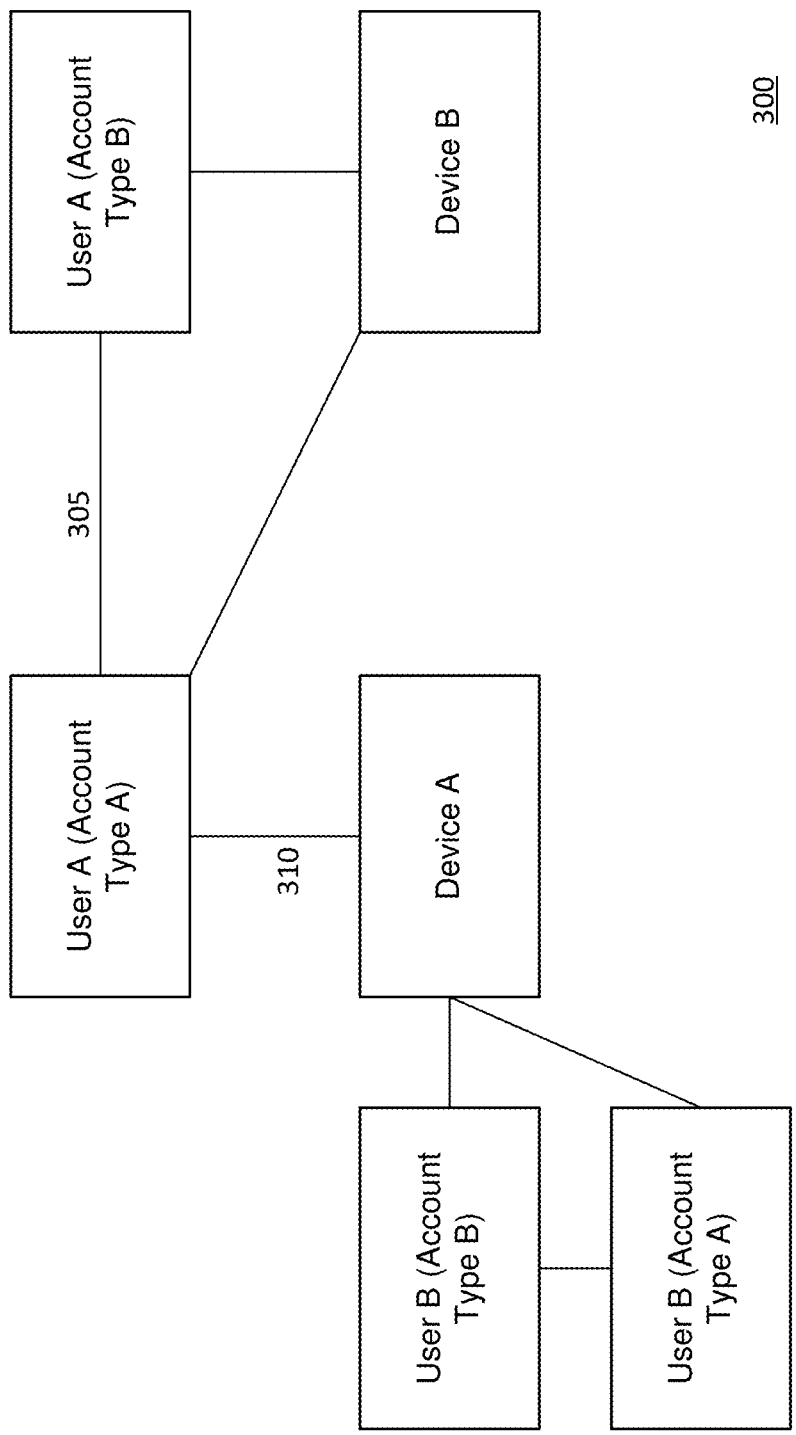
FIG. 3 illustrates an identity (ID) graph, in accordance with an embodiment.

FIG. 3 illustrates an example ID graph, in accordance with an embodiment. The ID graph 210 contains a plurality of edges linking one or more user accounts and one or more devices. For example, a first edge 305 links two different user accounts (a first account of type A associated with the user A, and a second account of type B associated with the user A), indicating that the two different accounts are associated with the same user (e.g., the user A). As used herein, an "account type" may refer to an account associated with a particular application, such as the online system 104, first party application 108, or third party application 106. For example, a "type A" account may correspond to an account for the online system 104, while a "type B" account may correspond to an account for the first party application 108.

In some embodiments, edges between accounts, such as the first edge 305, may be established based upon one or more shared account attributes. For example, each account may be associated with a plurality of different attributes, such as a username, email, and/or the like. In some embodiments, account attributes may include personally identifiable information (PII). Certain types of account attributes may be used to link different accounts with edges in the ID graph. For example, in some embodiments, if two accounts share a common email address, the online system 104 may infer that the two accounts are associated with the same user, and thus link the accounts via an edge in the ID graph 210. On the other hand, other types of account attributes may not be suitable over linking accounts via edges in the ID graph. For example, in some embodiments, username may not be considered a suitable attribute for linking accounts, as a particular user may use different usernames for different accounts, or have the same username as an account of a different type associated with a different user.

The online system 104 may have access to account attributes of a plurality of different accounts. For example, the online system 104 may have access to the account attributes of any accounts associated with the online system 104, as well as accounts associated with the first party application 108. On the other hand, the online system 104 may only have limited or no access to account attributes of accounts associated with the third party application 106. In some embodiments, the third party application 106 may transmit a portion of the attributes associated with an account when making a request to the online system 104. For example, where the user accesses the third party application 106 through an account, the third party application 106 may transmit one or more account attributes associated with the user's account to the online system 104 when making a request to the online system 104 (e.g., for one or more content items to be displayed to the user). The online system 104 may use the received account attributes to establish one or more edges in the ID graph 210 linking the third party application account with an account of the online system 104.

The ID graph 210 also illustrates a second edge 310 linking a user account (e.g., the first account of type A of the user A) to a particular device (e.g., the device A), indicating that the user of the account has accessed the account through the particular device. For example, the second edge 310 shows that the user A has accessed their account of type A through the user device A.

Edges between accounts and device, such as the second edge 310, may be established based upon historical records of user account accesses. When a user accesses their account associated with a particular application, a device ID of the user device they are using to access the account is communicated to the application. The online system 104 is able to maintain a record of when users having accounts associated with the online system 104 access their accounts and through which user devices. In addition, the online system 104 may receive information from the first party application 108 indicating through which devices users have accessed their accounts associated with the first party application 108. In some cases, a particular user may have accessed their account associated with a particular application through multiple different user devices. For example, the ID graph 210 indicates that user A has accessed their account of type A through device A as well as device B.

The online system 104 may update the ID graph 210 based upon recorded accesses to different user accounts over time. For example, referring back to FIG. 3, if the user A accesses their type B account through the device A, a new edge may be added to the ID graph connecting the user A type B account to the device A. If a user C (not shown) accesses an account of type A using the device A, a new node of the ID graph 210 may be constructed corresponding to the user C type A account, which will be connected to device A through a new edge in the ID graph 210. As the ID graph 210 is updated, the set of potential users that may be associated with the request 402 for a given device ID 404 may be maintained.

In some embodiments, the ID graph 210 may be updated based upon a temporal aspect. For example, a user device may change ownership over time, and so a user associated with a particular user device in the past may not always remain associated with the device. In some embodiments, if a user has not logged into an account through a device in a threshold amount of time, the edge of the ID graph 210 connecting the user's account to the device may be removed from the ID graph 210. On the other hand, edges in the ID graph 210 connecting different accounts (e.g., edge 305) signifying that the accounts are associated with the same user may never be removed from the ID graph 210, as it is typically less likely for the same account to change ownership.

In some embodiments, the edges of the ID graph 210 may be referred to as "explicit signals." An explicit signal provides an identifier of the user associated with a request. For example, an explicit signal may indicate that a user provided credentials such as login information to log into a particular user account using a user device. Alternatively, the explicit signal may provide a unique identifier for the user of the user device associated with the request, for example, an email, a login identifier, a user account identifier, and so on. In an embodiment, explicit signals provide information describing an identity of a user of the user device associated with a request with more than a threshold amount of certainty. For example, if two different accounts share the same PII (such as email address), then the online system may infer with more than a threshold amount of certainty that the accounts are associated with the same user. Accordingly, the online system creates an edge in the ID graph 210 between nodes representing the two different accounts. Similarly, if an account associated with a particular user is logged in through a particular user device, then the online system may determine that there is a very high likelihood that the user account is linked with the user device and the online system creates an edge in the ID graph 210 between a node representing the user account and a node representing the device.

In some embodiments, the online system 104 may be able to determine a user associated with a request from a third party application 108 based only on explicit signals. For example, if the third party application 108 transmits to the online system 104, as part of the request, account attribute information associated with the request, the online system 104 may be able to match the received account attribute information with an account at the online system 104 associated with the user. The online system 104 may then be able to provide an appropriate content item to the third party application 106 based upon known attributes of the identified user.

However, in many cases, the third party application 108 does not transmit account attribute information as part of the request. As such, the online system 104 may only receive a device ID corresponding to the user device 102 used by the user to access the third party application 106. In such cases, the online system 104 may be unable to determine a mostly likely user based on the ID graph 210 alone. Instead, the online system 104 may need to consider one or more implicit signals in conjunction with the ID graph 210 in order to determine a most likely user for determining a content item to send.

Inferring Users Using Implicit Signals

In some embodiments, the online system 104 infers a user of a shared device associated with a request from a third party application 106, based upon one or more implicit signals. An implicit signal does not provide an identifier for the user associated with the request. However, implicit signals provide information describing the current user from which an identifier of the user can be inferred with more than a threshold amount of certainty. For example, an implicit signal may simply provide the time of day at which the request associated with the device was processed. In some embodiments, the online system associates different users of a user device 102 with different times of day during which they are most likely to use the user device 102. As such, the online system 104 may infer a user ID of a user most likely associated with a received request based upon the time at which the request is received. Similarly, the implicit signal may identify a particular application associated with the request, for example, the application used to invoke the particular request. The online system may associate different users with different applications based on their past usage. Accordingly, the online system may infer the user of the device associated with the request based on the application associated with the request. In an embodiment, the online system may infer the user of the device based on a combination of signals, for example, the time of day as well as the application associated with the request. These inferences made by the online system may not be able to meet the threshold amount of certainty and thus be considered to be based on implicit signals.

Figure 4:
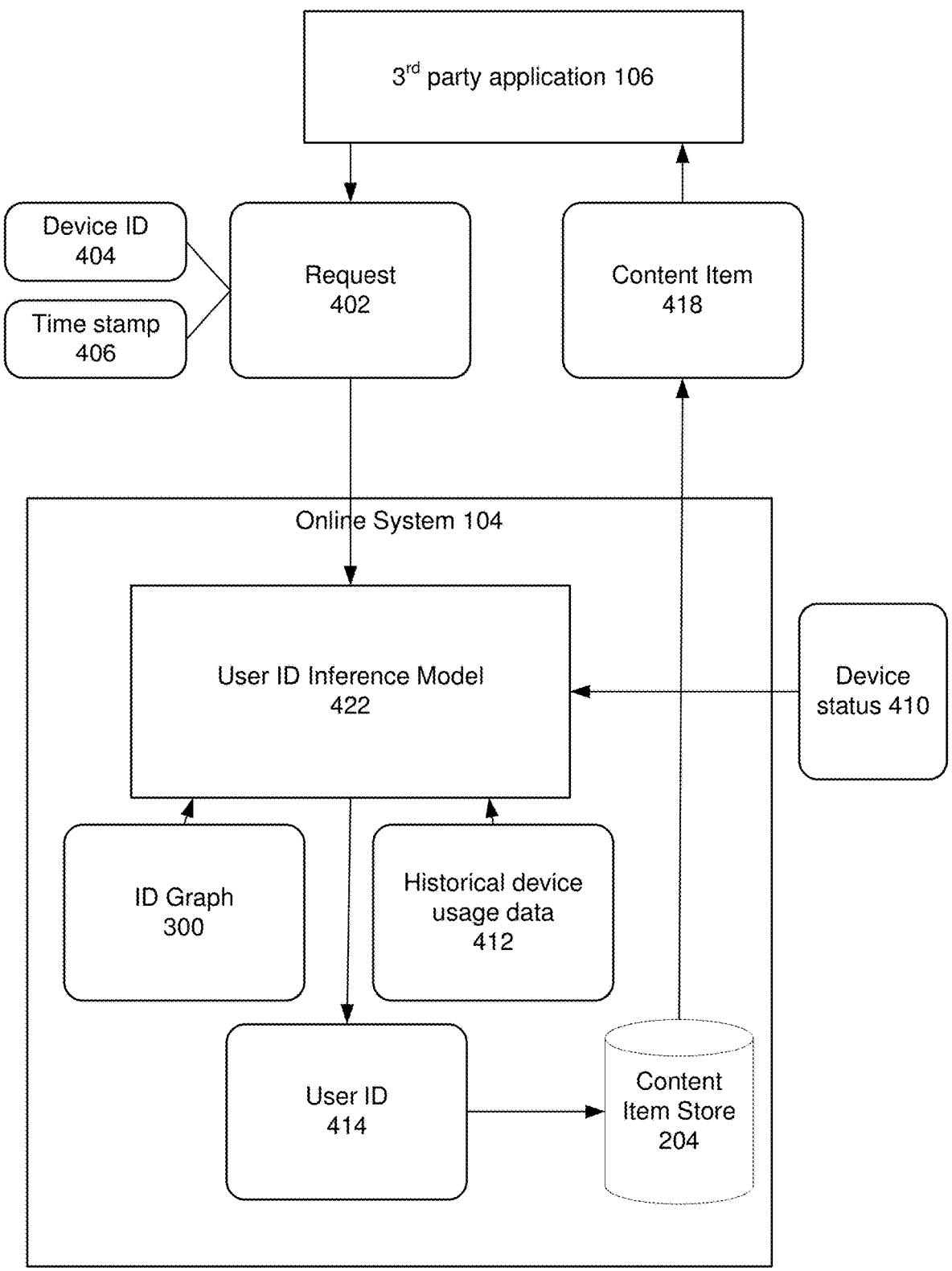
FIG. 4 illustrates a block diagram of the online system having a user ID inference model which can be used to respond to requests from a third party application, in accordance with an embodiment.

FIG. 4 illustrates a block diagram of the online system 104 having a user ID inference model which can be used to respond to requests from the third party application 106, in accordance with an embodiment. As illustrated in FIG. 4, the online system 104 may receive a request 402 from the third party application 106, and determine a user ID 414 corresponding to a user most likely to be associated with the request. The user ID 414 may be used to select a content item 418 from a content item store 204 to be sent for display to the user via the user device. For example, the content item 418 may comprise an advertisement targeted to the user associated with the user ID 414, a content recommendation for the user associated with the user ID 414, and/or the like.

The request includes a device ID 404 which indicates an identity of the user device 102 used to access the third party application 106 associated with the request. In some embodiments, the request 402 further includes additional parameters or features, such as a time stamp 406 indicating a time the request was made. In other embodiments, instead of the time stamp 406 being included in the request 402, the online system 104 determines the time stamp 406 based upon a time when the request 402 is received. Additional parameters or features (not shown) that may be received in the request 402 or determined by the online system 104 include information identifying the third party application 106, information associated with a type of content requested (e.g., restrictions on content type, content size, and/or the like), information associated with the user device 102 (e.g., location at which the user device 102 was used to access the third party application 106), etc.

The online system 104, upon receiving the request 402, uses the inference model 212 to infer a user ID 414 corresponding to a most likely user associated with the request 402. The inference model 212, when inferring a most likely user, may consider a plurality of different types of information, such as the ID graph 210, device status information 410, historical usage information 412, etc. The device status information 410 and historical usage information 412 may comprise information retrieved from the user profile store 206 and device profile store 208 illustrated in FIG. 2. In some embodiments, the inference model 212 accesses the ID graph 210, device status information 410, and/or historical usage information 412 based upon the device ID 404 associated with the received request 402. For example, the inference model 212 accesses device status information 410 corresponding to the device ID 404, to determine whether a user of the device is currently logged into an account associated with the online system 104 or the first party application 108 through the device.

The ID graph 210, as described above in relation to FIG. 3, may be used to identify different accounts associated with the same user (e.g., via edge 305), and different accounts to user devices 102 (e.g., via edge 310). In some embodiments, the inference model 212 accesses the ID graph 210 to determine a subset of users associated with the device ID 404 (also referred to as "candidate users"), from which the user ID 414 may be selected. For example, the inference model 212 may identify a device in the ID graph 210 corresponding to the received device ID 404, and determine which user accounts have been accessed through the identified device.

The device status information 410 may comprise information regarding the current status of the user device 102 in relation to the online system 104 and/or the first party application 108. In some embodiments, a particular user of the user device 102 may use more than one application through the user device 102 at a time, or use several applications through the user device 102 over a particular length of time. For example, the user may access the third party application 106 while also being logged into their account at the online system 104 or the first party application 108. In some embodiments, the user may interact with the online system 104 or the first party application 108 through the user device 102 within a particular period of time from when the request 402 from the third party application 106 is received by the online system 104. The inference model 212, upon receiving the device ID 404 corresponding to the request 402, may determine whether there has been any activity associated with the user device 102 in relation to the online system 104 or the first party application 108 within a threshold period of time from the receipt of the request 402.

In some embodiments, the inference model 212 may access the ID graph 210 to determine which users and user accounts are associated with the user device 102 using the edges indicating in the ID graph. The online system 104 may also determine the device status information 410 for the user device 102 based upon the status of each of the identified user accounts associated with the user device 102 (e.g., determining whether any of the identified user accounts are logged in or had any associated activity within a specified period of time).

In some embodiments, if a user is logged into their account on the online system 104 or the first party application 108 through the user device 102 when the request 402 is received, the inference model 212 infers that that the user is associated with the request 402. In some embodiments, if the user is associated with any activity on the online system 104 or first party application 108 through the user device 102 within a threshold period of time from the request 402, then the inference model 212 infers that the user is also associated with the request 402. Activity on the online system 104 or the first party application 108 may refer to any type of interaction between the user and the online system 104 or the first party application 108, such as logging into a user account, accessing a page associated with the online system 104 or the first party application 108, posting information on the online system 104 or the first party application 108, and/or the like.

A user may log into their account on the online system 104 or the third party application 108, but later go idle while their account continues to be logged in, whereupon a different user may use the user device 102 and access the third party application 106 to issue the request 402. Accordingly, the inference model 212 may, upon determining that a first user is logged into an account on the online system 104 or the first party application 108 at the time the request 402 is received, determine if there has been user activity associated with the account within a threshold period of time from the receipt of the request 402. The inference model 212 may infer that the first user is associated with the request 402 if there has been such activity, or infer that the first user is not associated with the request 402 if there has not been activity within the threshold period of time, even though their account is still logged in. The threshold period of time used if the user is currently logged into the account on the online system 104 or the first party application 108 may be different in comparison to the threshold period of time used if the user is no longer logged into their account on the online system 104 or the first party application 108 at the time the request 402 is received.

In some embodiments, the inference model 212 infers a user associated with the request 402 based upon historical information associated with usage of the user device 102. By comparing one or more parameters associated with the request 402 with historical information associated with the user device 102 having the device ID 404, inferences on which user is currently using the user device 102 may be made. The parameters may include the time stamp 406 associated with the request 402, the third-party application 106 from which the request 402 is received, a location of the user device 102 at a time the request 402 is received, and/or the like.

Different users of a shared user device 102 may generally be expected to use the user device at different times. For example, a first user of the user device 102 generally uses the user device in the morning, while a different user may generally use the user device 102 in the afternoon. In some embodiments, the inference model 212 may maintain historical usage data 412 for each user device 102, to build a mapping indicating which user is most likely to use the user device 102 at a given time of day. For example, the inference model 212 may generate a mapping table that maps ranges to times of day to users of the device.

The historical usage data 412 for a user device 102 may be constructed and maintained as different users of the user device 102 log into accounts associated with the online system 104 or the first party application 108 and interact with the online system 104 or the first party application 108. Each user action is recorded and associated with a timestamp. In some embodiments, the historical usage data 412 may also take into account past results of the inference model 212. For example, if the inference model 212 determines a user ID of a user most likely associated with a request from the third party application 106, then the historical usage data 412 may record a user action by the user identified by the interface model 212, at a time corresponding to the time of the request. In some embodiments, the inference model 212 may determine a confidence value of one or more users that may be associated with the request, indicating a probability that each user is associated with the request. In such cases, the historical usage data 412 may also record the confidence value of each user associated with a time of the recorded action.

The timestamped user actions may be used to associate different time periods with particular users of the user device 102. Associating a time period with a user may be based upon proximity of the time period to the times of the user's recorded actions, number of the user's recorded actions close to the time period (e.g., within a threshold time of the time period), the number of different users having recorded actions close to the time period, time since the most recent user action close to the time period, confidence values of the users associated with the recorded actions, and/or the like. In some embodiments, for a particular time period, the online system 104 may determine a confidence value for each user associated with the user device 102, indicating a probability that the user is associated with the time period. The time period may then be associated with the user having the highest confidence value. In some embodiments, the confidence value for a particular user and time period may be calculated based on any combination of the parameters described above. Each parameter is associated with a weight when determining the confidence value of whether a particular user is associated with a particular time period. The machine learning training engine 214 may train and adjust the parameter weights (e.g., using a set of training data or during operation as additional user activity data is received over different time periods). In some embodiments, parameter weights are adjusted on a "per device" basis, wherein each user device 102 may be associated with a different set of parameter weights. In other embodiments, a set of parameter weights may be applied to multiple devices.

Different users of a user device 102 may make use of different applications. For example, a first user of the user device 102 may primarily use the user device 102 to access a first set of applications (which may include at least one of the online system 104, third party application 106, and first party application 108), while a second user of the user device 102 may use the user device 102 primarily to access a different set of applications as the first user. In some embodiments, the online system 104 may track which applications different users are using through explicit signals. For example, the online system 104 may receive information from the first party application 108 as to which users are accessing the first party application 108 through the user device 102, and at which times. On the other hand, information on usage of the third party application 106 may be more limited. In some embodiments, the online system 104 may determine usage information relating to the third party application 106 based upon implicit signals. For example, the online system 104 may, using the inference model 212, infer that a particular user is using the third party application 106 at a particular time (e.g., when responding to the request 402 from the third party application 106). In addition, the online system 104 may update the historical usage data 412 based upon the determination, indicating usage of the third party application 106 by the particular user and the particular time. In some embodiments, the inference model 212, when inferring that a particular user is using the third party application 106 at a particular time, may associate the user with a confidence value indicating a probability that the user is actually using the third party application 106. The historical usage data 412 may take into account the confidence value as determined by the inference model 212 when recording usage of the third party application 106 by the particular user at the particular time.

The inference model 212 may determine a confidence value for each of a plurality of users, indicating a likelihood that the user is associated with the application making the request. The confidence value may be determined based upon a plurality of different parameters, such as frequency at which the application is used by the user, frequency of use by other users, and/or the like. Each parameter may be associated with a parameter weight, which may be updated and trained using the machine learning training engine 214. In some embodiments, the parameter weights may be updated and trained on a "per device" basis.

In some embodiments, the historical information associated with usage of the user device 102 may further comprise information associated with location of usage. Different users of a shared user device 102 may in some cases be expected to the use the user device in different locations. For example, a first user of the user device 102 may be most likely to use the user device from a first location, while a second user of the user device 102 may generally use the user device from a second location. When a particular user accesses the online system 104 or the first party application 108 through respective accounts, location of the user device 102 may be recorded. In addition, requests 402 from the third party application 106 may also contain information on location of the user device 102. As such, the historical usage data 412 maintained by the inference model 212 may record different locations from which different users have used the user device 102, and indicate which users are primarily associated with which locations. Consequently, the determination by the inference model 212 of which user is most likely associated with the request 402 may be based at least in part upon a location associated with the request 402, and whether any users are associated with the location. In addition, the determination of the inference model 212 of the user most likely associated with the request 402, along with any calculated confidence values, may be used to update the historical usage data 412.

In some embodiments, the inference model 212 determines which user is most likely associated a location of the request (e.g., by determining confidence values for each of a plurality of users and selecting a user with the highest confidence value). The determination may be based upon a plurality of parameters (e.g., frequency the user uses the device at the location, frequency of use at the location by other users, etc.). Each parameter may be associated with a parameter weight that may be maintained and trained using the machine learning training engine 214.

In some embodiments, the inference model 212 determines separate confidence values for a user based on time, application, or location. In other embodiments, the inference model 212 may determine a confidence value based on a combination of time, application, and/or location. For example, certain users of a user device may be more likely to use certain applications at certain times or at certain locations, or some combination thereof. As such, the inference model 212 may determine a confidence score for a user indicating a likelihood that the user is associated with a particular time period and application combination, a time period and location combination, and/or the like. The inference model 212 may aggregate the determined confidence values based on one or more parameter weights, to determine an aggregated confidence value for each user, indicating a likelihood that the user is associated with the request 402.

In some embodiments, the inference model 212 may infer the user ID of the user associated with the request 402 using a tiered process, wherein the inference model 212 attempts to infer the user ID using a plurality of different method, starting with a first method, and then using a subsequent method only if the inference model 212 is unable to infer the user ID using the previous method. For example, the inference model 212 may first determine whether the request 402 contains any explicit information that may be used to determine a user ID (e.g., an email address associated with the user that may be matched to a user account on the online system 104 or first party application 108). If a user ID is unable to be determined using this method, the inference model 212 may then attempt to infer a user ID based upon a current device status of the user device 102 (e.g., whether any user is logged into an account using the user device 102, or whether any user has had activity through the user device 102 within a threshold period of time from the request 402). If the inference model 212 cannot infer a user using this method, the inference model 212 may attempt to infer a user using other types of information (e.g., historical usage data, such as times different users are expected to use the user device 102, which applications users of the user device 102 most actively use, from which locations users of the user device 102 are expected to use the device, and/or the like). The order of methods used by the user model 408 may be based upon an expected certainty associated with each method.

In some embodiments, instead of a tiered process, the inference model 212 may weigh different parameters that may be used to infer a user ID of the user associated with the request 402 (e.g., a weighted sum). For example, each of the above-described parameters may be assigned a weight, based upon how dispositive the respective parameter is in determining whether a particular user is associated with the request 402. For example, explicit signal parameters, such as PII provided in the request 402 that may be matched with a user of the online system 104, may be given a higher weight, while implicit signal parameters, such as determinations of which users more frequently access the third party application 106 through the user device 102, or which users are expected to use the user device 102 over which time periods, may be given less weight. In some embodiments, certain implicit signal parameters, such as whether a time of the request 402 is associated with a particular user, may be given a confidence value in addition to a weight. For example, the confidence value may indicate a confidence that the particular user is associated with the time period corresponding to the request 402, while the weight indicates how dispositive the particular user being associated with the time period is in determining whether the particular user is associated with the request 402.

In some embodiments, the online system 104 may use the inference model 212 to determine a confidence value for each of the candidate users, based upon the weighted explicit and implicit signal parameters (and their respective confidence values associated with the implicit signal parameters, where applicable) for each user. The inference model 212 may then return the user ID 414 of the user with the highest confidence value in response to the request 402.

In some embodiments, the inference model 212 may use a combination tiered and weighted method for determining a user ID 414 in response to the request 402. For example, the inference model 212 may first attempt to determine a user ID using explicit signals if they are available. However, if the inference model 212 cannot determine a user ID using only explicit signals, the model 212 may consider all available implicit signals (e.g., device status information 410, historical usage data 412) in determining the user ID 414, wherein the various implicit signals may be assigned respective weights relative to each other.

In some embodiments, the inference model 212 may be generated and maintained using machine learning techniques (e.g., using the machine learning training engine 214). For example, the inference model 212 may be pre-configured with an initial set of implicit signal weights, and trained against sets of training data, the training data comprising requests associated with different user devices 102 with different timestamps 404 for which users are known. The inference model 212 may adjust the weights associated with the implicit signal parameters based upon the results of the training data.

As such, the inference model 212 may receive a request 402 from a third party application 106, the request 402 being associated with a device ID 404, an identifier of the third party application 106, and an indication of time that the request 402 is received. The inference model 212 extracts a plurality of features based upon the request 402 (e.g., device status information 410, historical usage data 412 for the device corresponding to the device ID 404), and produces a list of users (e.g., candidate users) each associated with a confidence value indicating a likelihood that the user is associated with the request 402. The users may be sorted based upon the calculated confidence values. In some embodiments, a user ID of the user associated with the highest confidence value may be used to identify a content item to be transmitted to the third party application 106 to be presented to the user on the user device 102.

Process Flow

Figure 5:
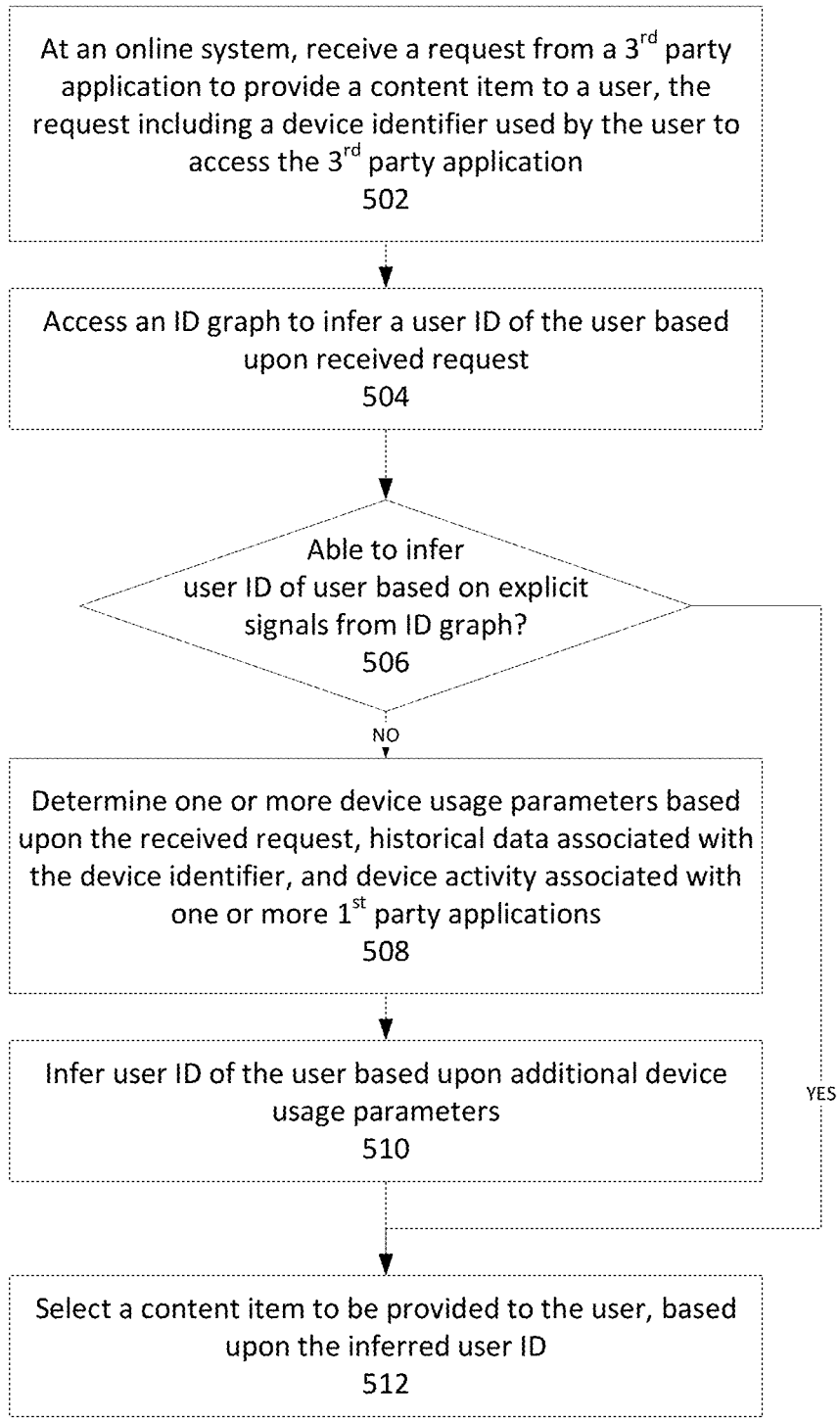
FIG. 5 is a flowchart of a process performed by an online system for determining a user ID based upon a request containing a device ID, in accordance with an embodiment.

FIG. 5 is a flowchart of a process performed by an online system for determining a user ID based upon a request containing a device ID, in accordance with an embodiment. At block 502, the online system receives a request from a third party application to provide a content item to a user. The request includes at least a device identifier (device ID) corresponding to the user device used by the user to access the third party application. In some embodiments, the request may be associated with a timestamp provided by the third party application. In other embodiments, the online system may determine the timestamp based upon a time at which the request is received.

At block 504, the online system accesses an ID graph and attempts to determine a user ID in response to the request using explicit signals. For example, in some embodiments, the request may include PII associated with the user which may be used to identify a user account on the online system associated with the user. However, in some embodiments, the request may not contain any PII, or may only include PII for which a corresponding user cannot be identified, in which case the online system will not be able to determine a user ID in response to the request using only explicit signals. In some embodiments, if the online system is unable to determine a user ID using explicit signals, the online system may use the ID graph to determine a set of candidate users, corresponding to a set of users known to have accessed the online system or another application through the user device corresponding to the received device ID.

At block 506, the online system determines whether it was able to determine a user ID using only explicit signals. If the online system was able to determine a user ID, then the process proceeds to block 512.

On the other hand, if the online system was not able to determine a user ID using explicit signals, the process proceeds to block 508, where the online system determines one or more additional parameters based upon the received request. The additional parameters may correspond to implicit signals based upon the received device ID and the associated timestamp. In some embodiments, the additional parameters may include device usage parameters, indicating a current or recent usage of the user device associated with the device ID. For example, the device usage parameters may indicate whether any users of the candidate users are logged into accounts associated with the online system or one or more first party applications at the time the request was received, or whether any users of the candidate users used to user device to perform any actions associated with accounts on the online system or first party applications within a threshold amount of time from the receipt of the request.

In some embodiments, the additional parameters may include historical usage data associated with the user device corresponding to the device ID received from the request. The historical usage data may track which users of the candidate users are most likely to be using the using device during a time period based upon the timestamp of the received request, which users of the candidate users are most likely to use the third party application through the user device, and/or the like. One or more of the additional parameters may be associated with a confidence value, indicating a likelihood that a particular candidate user is associated with a time period associated with the request, the third-party application from which the request was received, a location associated with the request, and/or the like.

At block 510, the online system infers a user ID based upon the additional determined parameters. For example, the online system may maintain a user model that analyzes the additional determined parameters to determine a user ID corresponding to a user most likely associated with the received request. In some embodiments, the user model may assign each parameter a weight indicating how dispositive the respective parameter is in determining the user ID. For example, in some embodiments, if it is determined that a particular user has performed an action associated with an account on the online system or first party application within a threshold time of the received request, it may be a strong indication that the user is associated with the received request. Thus, a parameter indicating this determination may be given high weight.

At block 512, the online system selects a content item to be provided to the user, based upon the determined user ID. In some embodiments, the online system identifies a user profile based upon the determined user ID, whereupon the content item may be selected based upon one or more attributes associated with the user profile, such as user demographic information, user activity history, user preferences, and/or the like. The content item may be transmitted to the third party application, which may then display the content item to the user. In some embodiments, selection of the content item may be performed by an external application. For example, the online system may transmit the determined user ID to the external application, which may return the content item or an identifier of the content to the online system to be provided to the third party application.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
receiving, by an online system, from a third-party application of one or more third-party applications, a request to provide a content item to a user, the request including at least a device identifier corresponding to a user device used by the user to access the third-party application, and wherein the user device is used by a plurality of users corresponding to respective user identifiers;
accessing and executing a device-specific model to infer a user identifier of the user, wherein the device-specific model is trained using historical usage data of the plurality of users specific to the user device associated with the device identifier, the historical usage data describing user interactions of each of the users with the one or more third party applications using the user device, and is configured to:
determine one or more candidate users associated with the user device, the one or more candidate users comprising at least a portion of the plurality of users;
determine one or more device usage parameters based upon the received request and at least one of retrieved historical data of the specific device associated with the device identifier, or an indication of activity of the specific device associated with the device identifier on the online system or one or more first-party applications;
wherein the device-specific model infers the user identifier of the user based on the one or more device usage parameters and the one or more candidate users; and
selecting and transmitting to the third-party application a content item to be provided to the user in response to the received request.

2. The method of claim 1, wherein model determines the one or more candidate users by accessing a graph comprising a plurality of connections, each connection corresponding to a connection between two or more accounts associated with different applications corresponding to a particular user, or a connection between an account of the particular user and a user device used by the particular user to access the account.

3. The method of claim 2, wherein the one or more candidate users correspond to connections in the graph between the user device and accounts of the one or more candidate users.

4. The method of claim 1, wherein the one or more device usage parameters includes at least one of: frequency of which each of the one or more candidate users uses the device, frequency of usage of each of the one or more third-party applications by each of the one or more candidate users on the device, or time of day typically associated with each of one or more candidate users of the device.

5. The method of claim 1, wherein the model infers the user identifier of the user based upon a user identifier associated with the indication of activity associated with the device on a first-party application of the one or more first-party applications.

6. The method of claim 1, wherein the model infers the user identifier of the user based at least in part upon a weighted sum of the one or more device usage parameters.

7. The method of claim 1, wherein the device-specific model accesses a set of parameter weights associated with the specific device associated with the device identifier.

8. A computer-implemented method, comprising:
receiving, by an online system, a request to determine a user currently using a user device to interact with a third party application, the request comprising information describing a current session of the user device with the third party application, wherein the user device is shared across a plurality of users corresponding to respective user identifiers to execute one or more third party applications;
extracting features describing the current session of the user device with the third party application, the features comprising at least a time of day of the session;
providing the extracted features including the time of day as input to a device-specific machine learning based inference model, the inference model configured to identify a user of the plurality of users of the user device based upon the extracted features, wherein the inference model is trained using historical usage data of the plurality of users specific to the user device associated with the device identifier, the historical usage data describing user interactions of each of the users with the one or more third party applications using the user device;
determining the user currently using the user device to interact with the third party application based on the inference model;
selecting one or more content items based on a user profile of the identified user; and
sending the one or more content items to the user device for display to the user of the user device.

9. The method of claim 8, wherein determining the user currently using the user device to interact with the third party application based on the inference model comprises accessing a graph comprising a plurality of connections to determine a set of candidate users comprising at least a portion of the plurality of users, each connection of the graph corresponding to a connection between two or more accounts associated with different applications corresponding to a particular user, or a connection between an account of the particular user and a user device used by the particular user to access the account.

10. The method of claim 9, wherein the set of candidate users correspond to connections in the graph between the user device and accounts of the set of candidate users.

11. The method of claim 8, wherein the historical usage data includes at least one of: frequency of which users of the plurality of users use the user device, frequency of usage of the one or more third-party applications by users of the plurality of users of the user device, or time of day typically associated with users of the plurality of users of the user device.

12. The method of claim 8, wherein the inference model determines the user based upon an indication of activity associated with the user device on a first-party application.

13. The method of claim 8, wherein the inference model determines the user based at least in part upon a weighted sum of one or more parameters associated with the extracted features.

14. A non-transitory computer readable storage medium, storing instructions for:
  receiving, by an online system, from a third-party application of one or more third-party applications, a request to provide a content item to a user, the request including at least a device identifier corresponding to a user device used by the user to access the third-party application, and wherein the user device is used by a plurality of users corresponding to respective user identifiers;
  accessing and executing a device-specific model to infer a user identifier of the user, wherein the device-specific model is trained using historical usage data of the plurality of users specific to the user device associated with the device identifier, the historical usage data describing user interactions of each of the users with the one or more third party applications using the user device, and is configured to:
    determine one or more candidate users associated with the user device, the one or more candidate users comprising at least a portion of the plurality of users;
    determine one or more device usage parameters based upon the received request and at least one of retrieved historical data of the specific device associated with the device identifier, or an indication of activity of the specific device associated with the device identifier on the online system or one or more first-party applications;
    wherein the device-specific model infers the user identifier of the user based on the one or more device usage parameters and the one or more candidate users; and
  selecting and transmitting to the third-party application a content item to be provided to the user in response to the received request.

15. The non-transitory computer readable storage medium of claim 14, wherein model determines the one or more candidate users by accessing a graph comprising a plurality of connections, each connection corresponding to a connection between two or more accounts associated with different applications corresponding to a particular user, or a connection between an account of the particular user and a user device used by the particular user to access the account.

16. The non-transitory computer readable storage medium of claim 15, wherein the one or more candidate users correspond to connections in the graph between the user device and accounts of the one or more candidate users.

17. The non-transitory computer readable storage medium of claim 14, wherein the one or more device usage parameters includes at least one of: frequency of which each of the one or more candidate users uses the device, frequency of usage of each of the one or more third-party applications by each of the one or more candidate users on the device, or time of day typically associated with each of one or more candidate users of the device.

18. The non-transitory computer readable storage medium of claim 14, wherein the model infers the user identifier of the user based upon a user identifier associated with the indication of activity associated with the device on a first-party application of the one or more first-party applications.

19. The non-transitory computer readable storage medium of claim 14, wherein the model infers the user identifier of the user based at least in part upon a weighted sum of the one or more device usage parameters.

20. The non-transitory computer readable storage medium of claim 14, wherein the device-specific model accesses a set of parameter weights associated with the specific device associated with the device identifier.

\* \* \* \* \*